No. 863,825.
PATENTED AUG. 20, 1907.
M. ACKER.
SINK.
APPLICATION FILED NOV. 12, 1906.
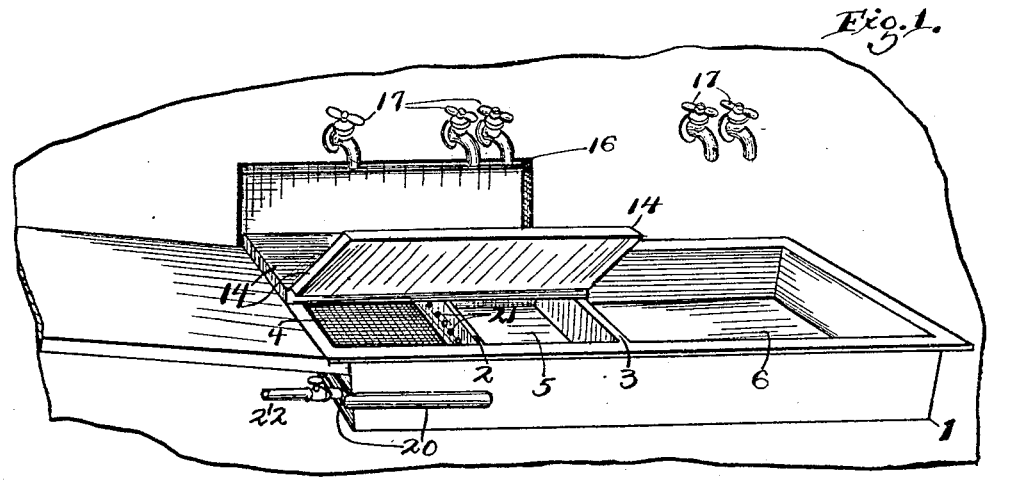
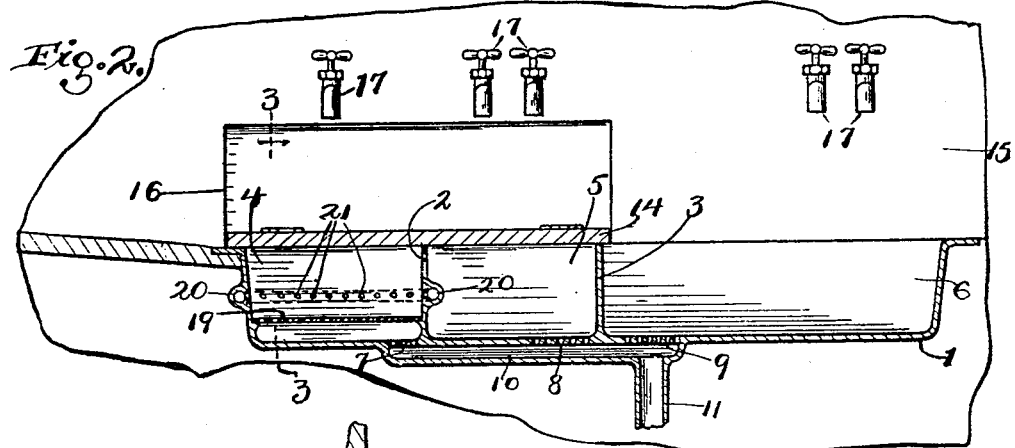
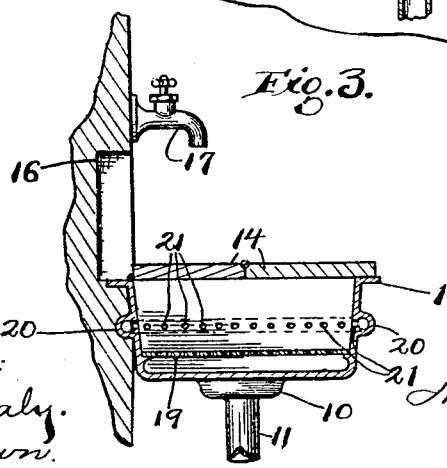
WITNESSES:
Daniel E. Haly.
B. C. Brown.
INVENTOR
Margaret Acker
BY
Lynch & Orer
her ATTORNEYS.

UNITED STATES PATENT OFFICE.

MARGARET ACKER, OF LAKEWOOD, OHIO.

SINK.

No. 863,825.      Specification of Letters Patent.      Patented Aug. 20, 1907.

Application filed November 12, 1906. Serial No. 343,142.

*To all whom it may concern:*

Be it known that I, MARGARET ACKER, a citizen of the United States of America, residing at Lakewood, in the county of Cuyahoga and State of Ohio, have invented certain new and useful Improvements in Sinks; and I hereby declare the following to be a full, clear, and exact description of the invention, such as will enable others skilled in the art to which it pertains to make and use the same.
This invention relates to improvements in kitchen sinks.

The object of this invention is to provide a sink that will facilitate the washing, rinsing, draining and storing of soiled dishes and cooking utensils.
The invention therefore consists in the features of construction and combination of parts as described in the specification, pointed out in the claims and illustrated in the accompanying drawings.

In the accompanying drawings Figure 1 is a view in perspective of a sink embodying my invention, showing the lid partly raised. Fig. 2 is a view in central vertical section of my invention, showing the lid down. Fig. 3 is a sectional view taken on line 3—3, Fig. 2.

Again referring to the drawings 1 represents the basin of the sink which is divided by means of partitions 2 and 3 into three compartments 4, 5 and 6.

In the bottoms of the compartments 4, 5 and 6 are formed drainage openings 7, 8 and 9 respectively which communicate with a common passage-way 10, which opens into a drain pipe 11. A jointed lid 14 is hinged at the rear side of the basin 1 and is arranged to extend over the compartments 4 and 5. In the wall 15 which forms the support for the sink is formed a recess 16 which is arranged to receive the lid when it is raised.
Above the basin 1 are arranged faucets 17 for supplying the necessary water for cleansing the articles placed therein. In the compartment 4 a short distance above the bottom is arranged a perforated plate 19 for supporting the dishes and permitting them to drain after they have been washed.

In the wall of the compartment 4 is formed a water passage-way 20 which is provided with jet orifices 21. A valved water supply pipe 22 connects with the water passage-way 20 and when it is so desired any dishes or other utensils on the perforated plate 19 can be subjected to a thorough spraying.

The advantages of my improved sink are as follows,— All the large dishes or kitchen utensils can be washed in the large compartment 6 and the dirt or grease thereof will be kept entirely separate from the other compartments which are particularly designed for cleansing the table service. The dishes and other articles of the table are first put in the compartment 5 and after being cleansed are placed in the compartment 4 on the perforated plate where they can be sprayed and thoroughly rinsed and then permitted to drain. The advantage of the lid is readily apparent for if it is necessary to allow the articles to stand in the compartment 5 the lid will conceal them and thereby prevent them from presenting an unsightly appearance to those having occasion to enter the room where the sink is located and will at the same time prevent the water from cooling too rapidly. The lid also protects the dishes which are being drained in the compartment 4 from dust which might otherwise settle thereon.

What I claim is:—

The combination of a basin, partitions arranged transversely of said basin so as to divide it into three compartments, each of said compartments being provided with a drainage opening, a passage-way connecting said openings, a drain pipe in open communication with said passage-way, a perforated plate arranged in one of said compartments and a water passage-way arranged in the wall of said last-mentioned compartment above said plate, said passage-way being provided with jet orifices for spraying water above said plate.

In testimony whereof, I sign the foregoing specification, in the presence of two witnesses.

MARGARET ACKER.

Witnesses:
VICTOR C. LYNCH,
N. L. McDONNELL.